(12) United States Patent
Olson

(10) Patent No.: US 11,060,562 B2
(45) Date of Patent: Jul. 13, 2021

(54) AXIALLY ACTUATED LOCKING SYSTEM FOR A RETRACTABLE DRIVESHAFT AND METHOD FOR USE THEREOF

(71) Applicant: Bell Helicopter Textron Inc., Fort Worth, TX (US)

(72) Inventor: Eric Stephen Olson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 735 days.

(21) Appl. No.: 15/942,554

(22) Filed: Apr. 1, 2018

(65) Prior Publication Data

US 2019/0301537 A1 Oct. 3, 2019

(51) Int. Cl.
*B64C 3/56* (2006.01)
*F16D 1/108* (2006.01)
*F16D 1/10* (2006.01)
*B64C 11/28* (2006.01)
*B64C 29/00* (2006.01)

(52) U.S. Cl.
CPC ............... *F16D 1/108* (2013.01); *B64C 3/56* (2013.01); *B64C 11/28* (2013.01); *B64C 29/0033* (2013.01); *F16D 2001/103* (2013.01)

(58) Field of Classification Search
CPC ........ F16D 1/108; B64C 3/56; B64C 29/0033
See application file for complete search history.

(56) References Cited

U.S. PATENT DOCUMENTS

| 5,360,376 A | 11/1994 | Baldino | |
|---|---|---|---|
| 2014/0161509 A1* | 6/2014 | Choi | F16D 1/108 403/2 |

* cited by examiner

*Primary Examiner* — Daniel J Wiley
(74) *Attorney, Agent, or Firm* — Lightfoot & Alford PLLC

(57) ABSTRACT

A locking system for use with a retractable driveshaft includes a housing, a rotating locking ring located at least partially to the housing, and a band configured to cooperatively engage the rotatable locking ring. Applying an axial force to the locking ring with the driveshaft causes rotation of the locking ring, thereby locking the driveshaft with the housing. Applying a second axial force to the locking ring with the driveshaft causes further rotation of the locking ring, which allows withdrawal of the driveshaft from the housing.

20 Claims, 11 Drawing Sheets

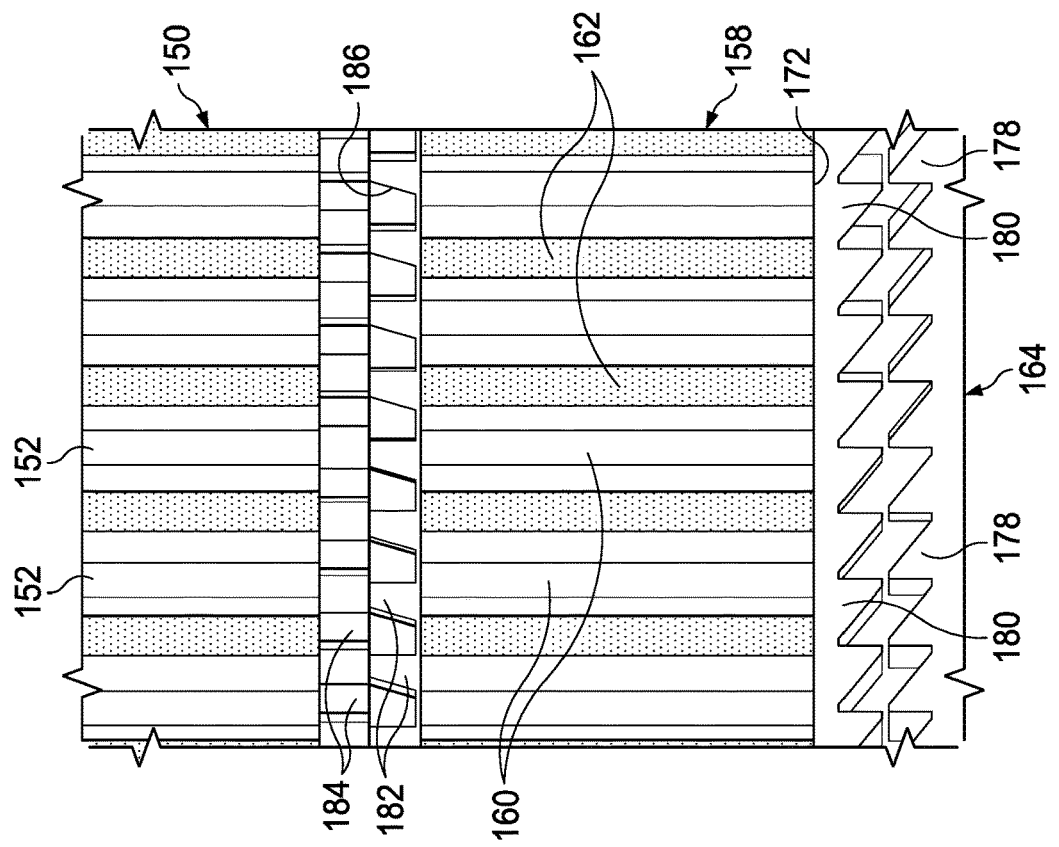
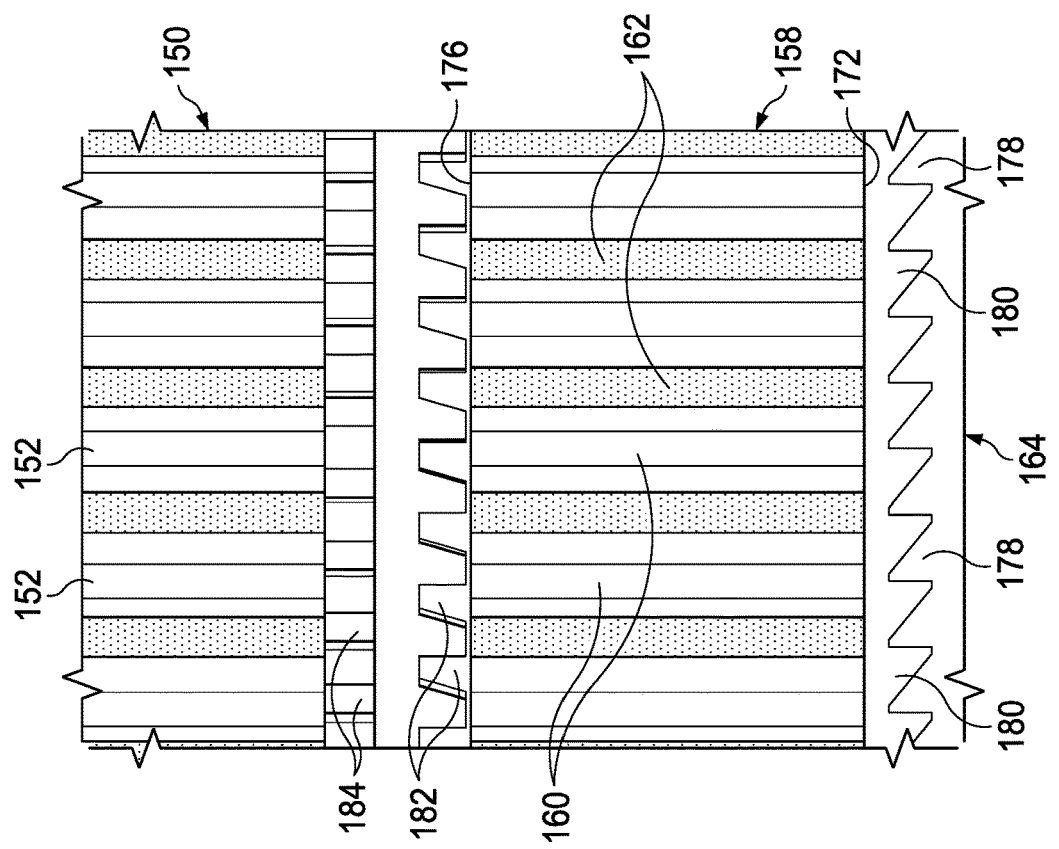

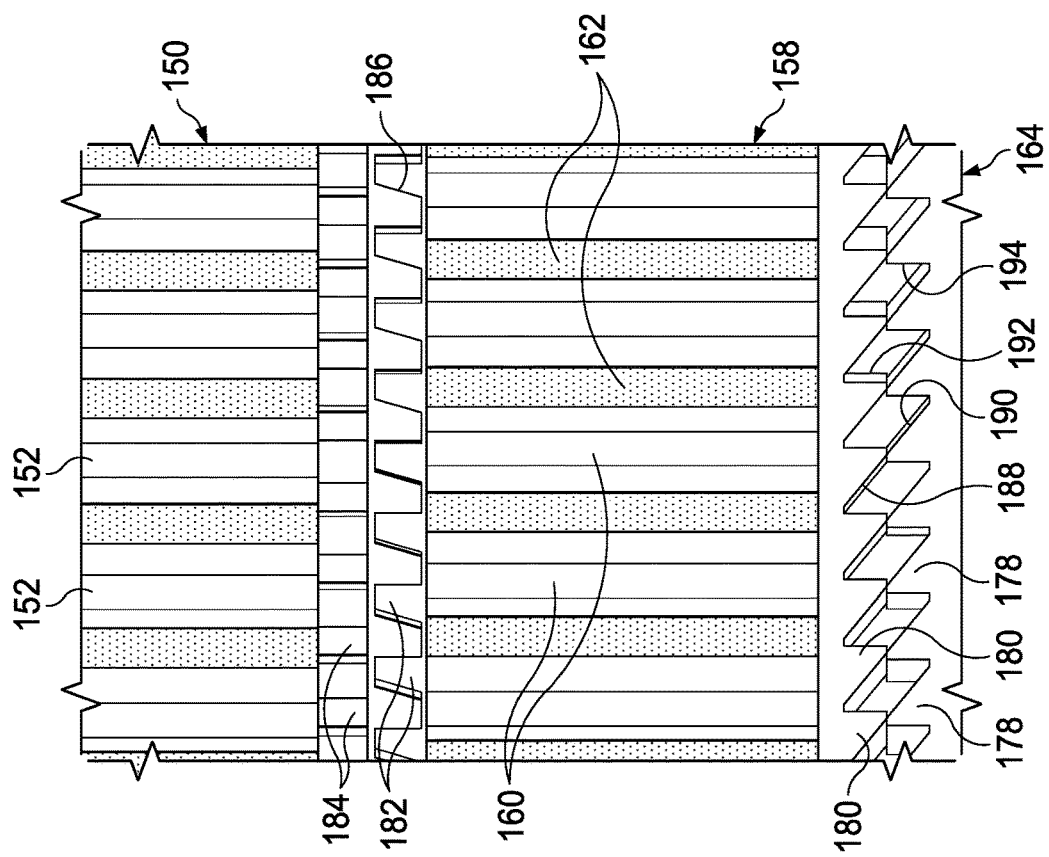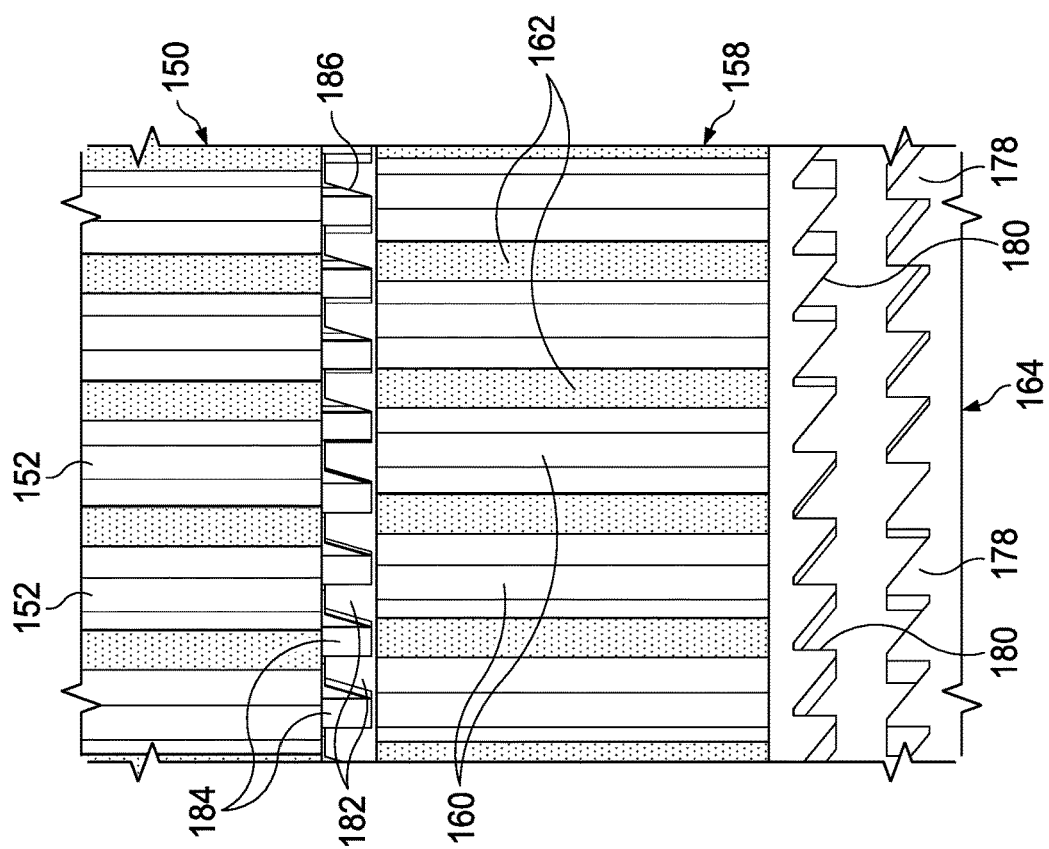

AXIALLY ACTUATED LOCKING SYSTEM FOR A RETRACTABLE DRIVESHAFT AND METHOD FOR USE THEREOF

BACKGROUND

Many types of aircraft include elongated wings that extend laterally from a fuselage. These types of aircraft generally occupy a large amount of space and have a large overall footprint. As such, when these types of aircraft are not in use, they occupy an undesirably large amount of space to store them on aircraft carriers, in hangers, runways, and other spaces. And furthermore, access to hangars and/or other indoor maintenance or repair facilities may be restricted because some types of aircraft may not fit through the doors and/or entrances of such facilities. Accordingly, technology has been developed that allows for the rotation of the wing relative to the fuselage to minimize the footprint of the aircraft. One such example is disclosed in U.S. patent application Ser. No. 15/898,550, filed Feb. 17, 2018, titled Selectively Engageable Aircraft Driveshaft Off-Axis From Component Stow Axis, which is incorporated herein by reference in its entirety. The selectively engageable driveshaft is translated along its axis of rotation between an engaged and disengaged position by an actuator. However, the actuator should not be relied upon to maintain the engagement. Therefore, an apparatus for locking the driveshaft in the engaged position is desirable.

BRIEF DESCRIPTION OF THE DRAWINGS

FIG. 7A is a side view of a portion of the axially actuated locking system of FIG. 5, shown in the unlocked position.

FIG. 7B is a side view of the portion of the axially actuated locking system of FIG. 7A, shown beginning the locking process.

FIG. 7C is a side view of the portion of the axially actuated locking system of FIG. 7A, shown halfway through the locking process.

FIG. 7D is a side view of the portion of the axially actuated locking system of FIG. 7A, shown finishing the locking process.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges an axially actuated locking system for locking a retractable driveshaft in an engaged position. While this disclosure describes the axially actuated locking system for use on an aircraft, its application is not so limited. It should be understood that the disclosed axially actuated locking system could be used with any application having a disengageable shaft.

Figure 1:
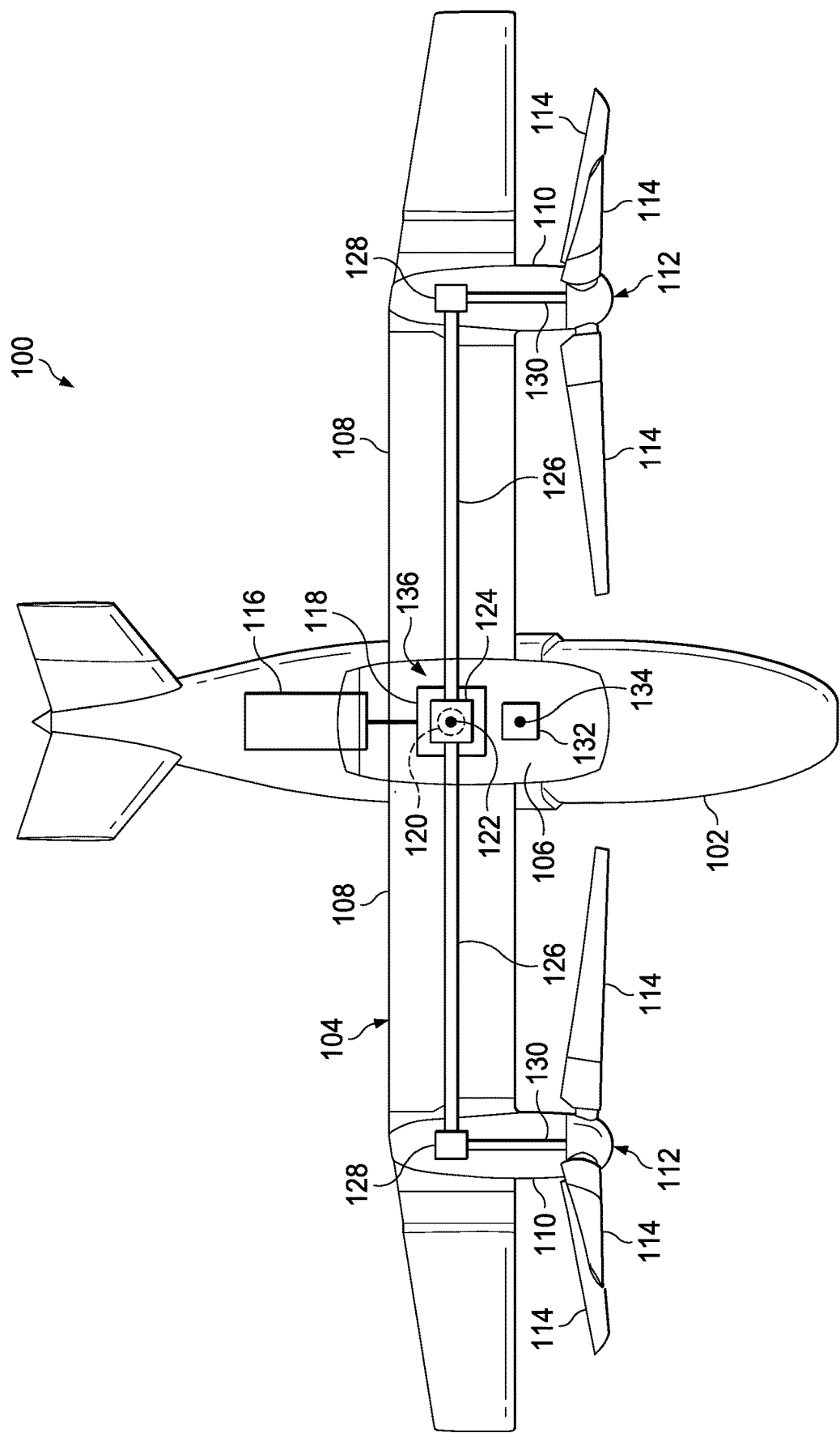
FIG. 1 is a top view of an aircraft according to this disclosure.

Referring now to FIG. 1, a top view of an aircraft 100 is shown according to this disclosure. Aircraft 100 is shown and described as a tiltrotor aircraft. However, aircraft 100 may be any type of vehicle. Aircraft 100 includes a fuselage 102 and a stowable wing assembly 104 including a rotatable wing body 106 and a plurality of wings 108 extending therefrom. Each wing 108 has a pylon 110 coupled thereto. Pylons 110 each include a rotor assembly 112 with a plurality of rotor blades 114. Each pylon 110 is rotatable between a horizontal orientation and a vertical orientation with respect to fuselage 102 and associated wing 108 to adjust the thrust angle and transition aircraft 100 between an airplane mode and a helicopter mode. Accordingly, the airplane mode is associated with a more horizontally-oriented thrust angle and propelling aircraft 100 forward in flight, while the helicopter mode is associated with a more vertically-oriented thrust angle and propelling aircraft 100 to and from a landing area.

Aircraft 100 also includes a drive component carried in fuselage 102. In the embodiment shown, the drive component includes an internal combustion engine 116 coupled to an engine reduction gearbox 118 which features a retractable driveshaft 120. However, in other embodiments, the drive component may comprise a direct-drive electric motor, a direct-drive engine, a motor and gearbox combination, or an engine and a redirection gearbox, each having retractable driveshaft 120. In the embodiment shown, operation of internal combustion engine 116 causes retractable driveshaft 120 to rotate about a rotation axis 122. Retractable driveshaft 120 is extended and retracted axially along rotation axis 122 to engage and disengage from an auxiliary or mid-wing gearbox 124 disposed within rotatable wing body 106 of wing assembly 104. Mid-wing gearbox 124 is operatively coupled to an interconnect driveshaft 126 extending therefrom through each wing 108 to a pylon gearbox 128 disposed in each pylon 110. Each pylon gearbox 128 is coupled to associated rotor assembly 112 through a rotor mast 130. Thus, when retractable driveshaft 120 is engaged with mid-wing gearbox 124, rotation of retractable driveshaft 120 imparted by internal combustion engine 116 is transmitted through mid-wing gearbox 124 to interconnect driveshafts 126 and rotor masts 130 to impart rotation to counter-rotating rotor assemblies 112. Conversely, when retractable driveshaft 120 is disengaged from mid-wing gearbox 124, rotation of retractable driveshaft 120 will not impart rotation to rotor assemblies 112. As such, retractable driveshaft 120 allows internal combustion engine 116 to operate to run pre-flight checks, provide electrical power, and/or provide functions of an auxiliary power unit without engaging rotor assemblies 112.

Aircraft 100 may also include a wing assembly rotation system 132 configured to rotate wing assembly 104 with respect to fuselage 102 about a stow axis 134. Most notably, stow axis 134 is offset from rotation axis 122 of retractable driveshaft 120. More specifically, stow axis 134 is displaced longitudinally along a length of fuselage 102 with respect to rotation axis 122 of retractable driveshaft 120. In some embodiments, the offset between stow axis 134 and rotation axis 122 may be about twelve inches. The location of rotation axis 122 is generally determined by the optimal placement of interconnect driveshafts 126 and/or mid-wing gearbox 124 within wing assembly 104. Stow axis 134 is generally selected to center wing assembly 104 over fuselage 102, thereby reducing the overall footprint of aircraft 100 when wing assembly 104 is rotated. Further, offsetting stow axis 134 further forward on wing assembly 104 may provide structural benefits, such as allowing rotation of wing assembly 104 in a thicker, more structurally rigid portion of wing assembly 104. Additionally, as will be discussed in more detail below, retractable driveshaft 120 must be capable of disengaging from mid-wing gearbox 124 and fully withdrawing from wing assembly 104 because stow axis 134 and rotation axis 122 are not co-axial. Because engine reduction gearbox 118, retractable driveshaft 120, mid-wing gearbox 124, and wing assembly rotation system 132 function together to facilitate the transition to a stowed configuration, they may be referred to collectively as a stow system 136.

Figure 2:
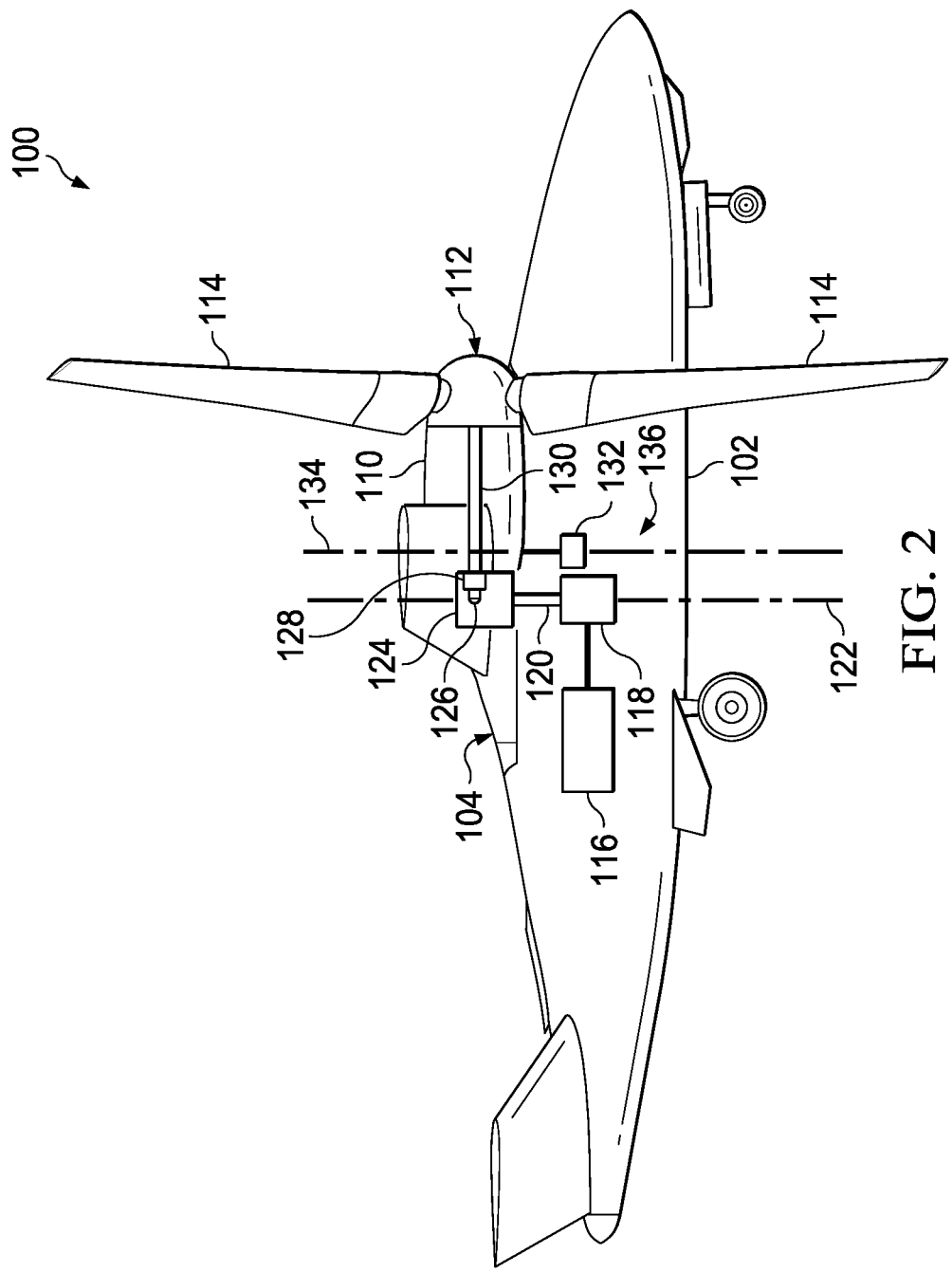
FIG. 2 is a side view of the aircraft of FIG. 1.

Referring now to FIG. 2, aircraft 100 is shown with retractable driveshaft 120 engaged with mid-wing gearbox 124 and wing assembly 104 in a flight position. As shown, retractable driveshaft 120 is extended vertically to engage mid-wing gearbox 124 when wing assembly 104 is configured in the flight position. Thus, when retractable driveshaft 120 is engaged with mid-wing gearbox 124, rotational motion of retractable driveshaft 120 imparted by internal combustion engine 116 is transferred through mid-wing gearbox 124 to interconnect driveshafts 126 and rotor masts 130 to impart rotation to counter-rotating rotor assemblies 112 to propel aircraft 100.

Figure 3:
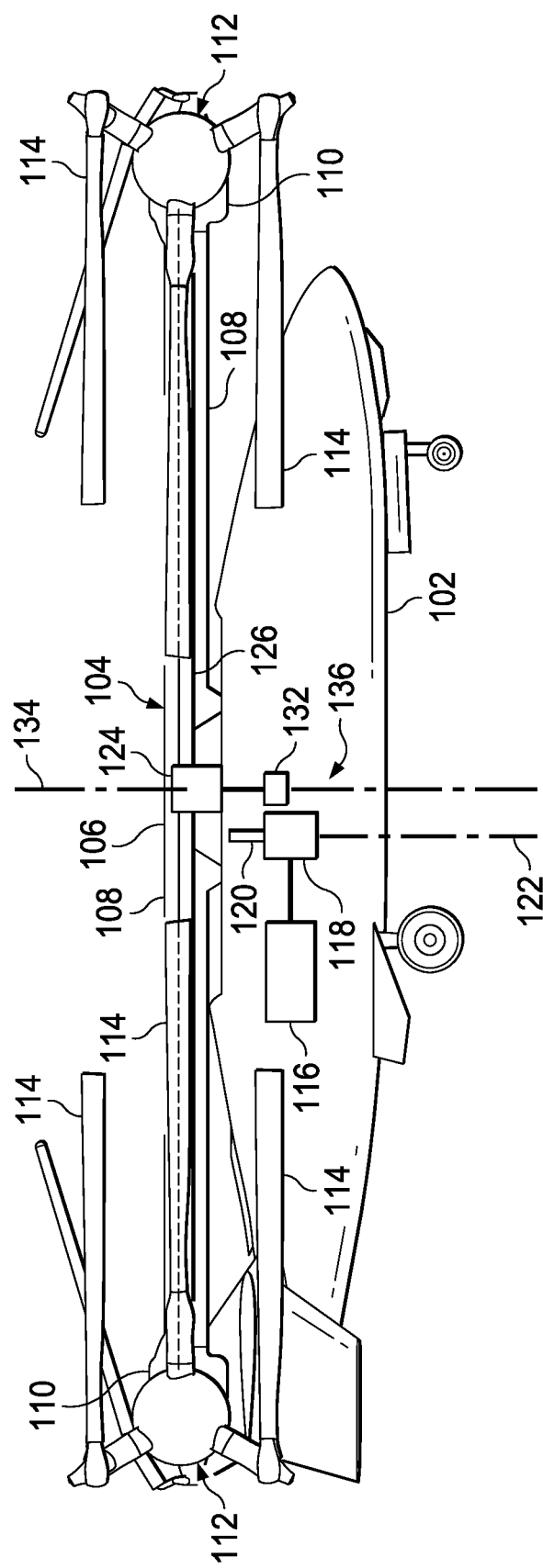
FIG. 3 is a side view of the aircraft of FIG. 1.

Referring now to FIG. 3, aircraft 100 is shown with retractable driveshaft 120 disengaged from mid-wing gearbox 124 and wing assembly 104 in a stowed position. As shown, retractable driveshaft 120 is retracted vertically to disengage from mid-wing gearbox 124. After retractable driveshaft 120 is disengaged from mid-wing gearbox 124, wing assembly 104 may be rotated relative to fuselage 102 about stow axis 134 in a clockwise direction as viewed from the top of aircraft 100 until wing assembly 104 reaches the stowed position. In the stowed position, retractable driveshaft 120 is misaligned from mid-wing gearbox 124. In some embodiments, the stowed configuration of wing assembly 104 may be reached after wing assembly 104 is rotated about ninety degrees. Furthermore, wing assembly 104 may be rotated relative to fuselage 102 about stow axis 134 in a counter-clockwise direction.

Figure 4A:
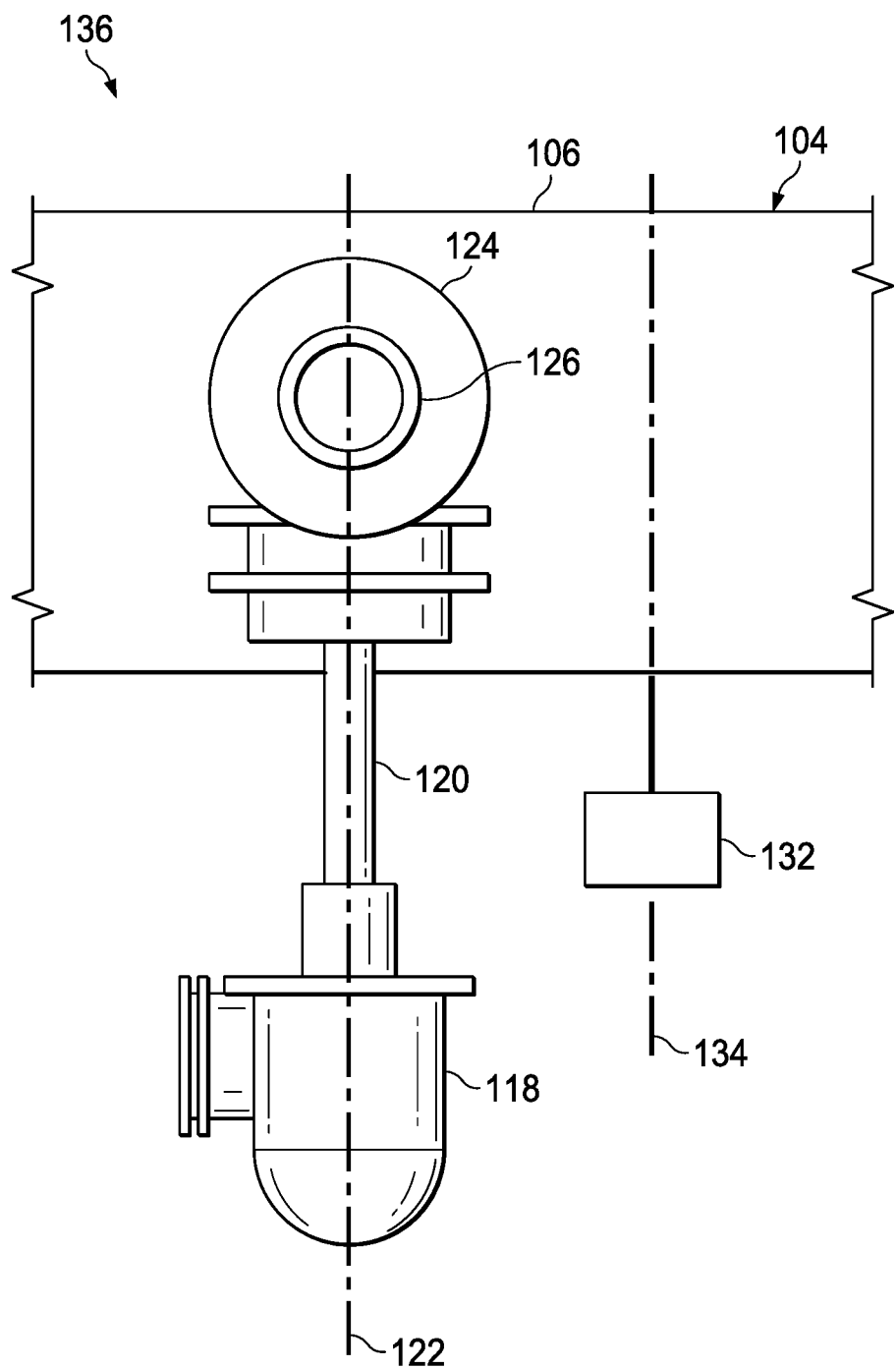
FIG. 4A is a side view of a stow system of the aircraft of FIG. 1 in an engaged position.
Figure 4B:
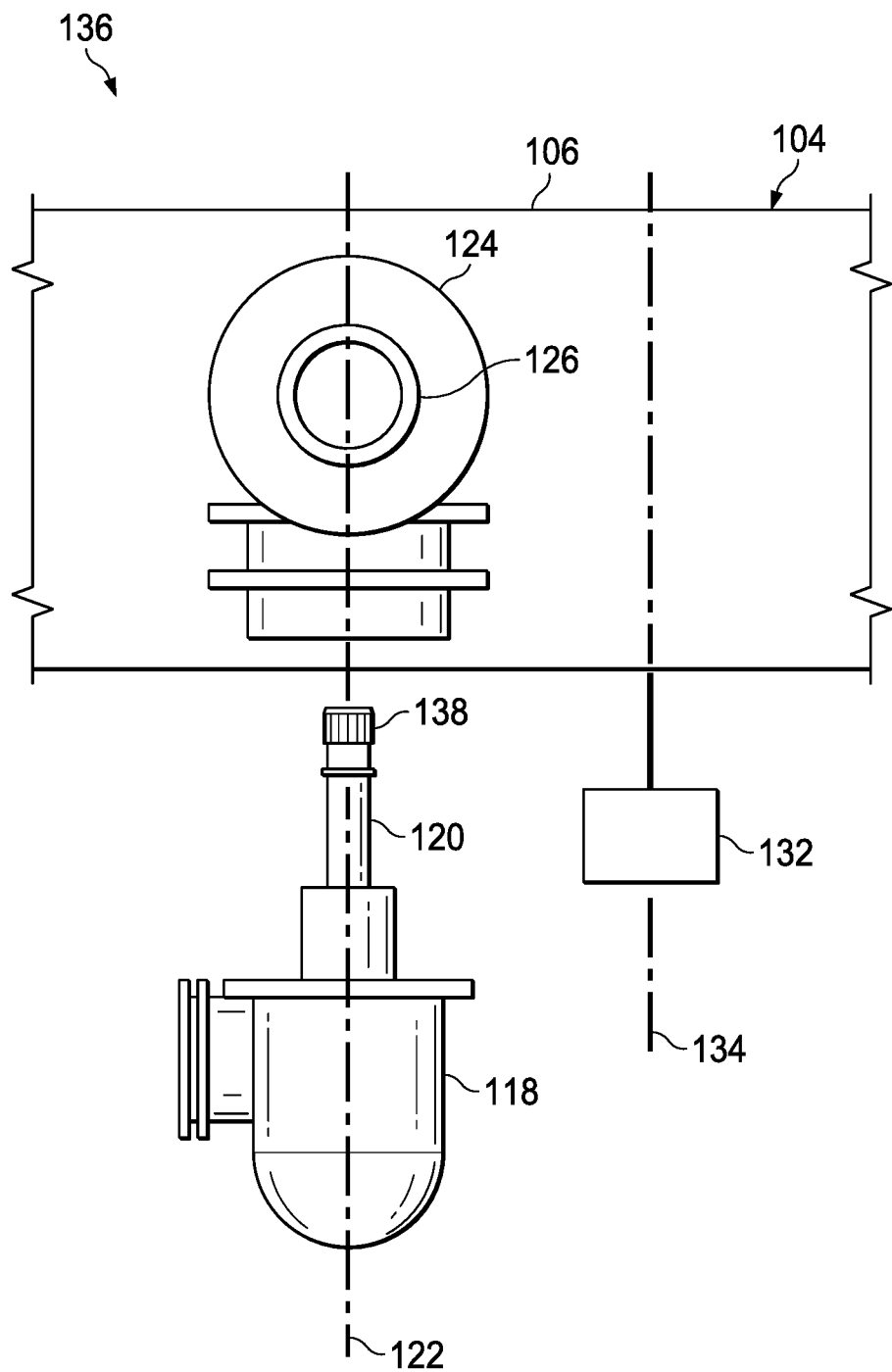
FIG. 4B is a side view of the stow system of the aircraft of FIG. 1 in a disengaged position.
Figure 4C:
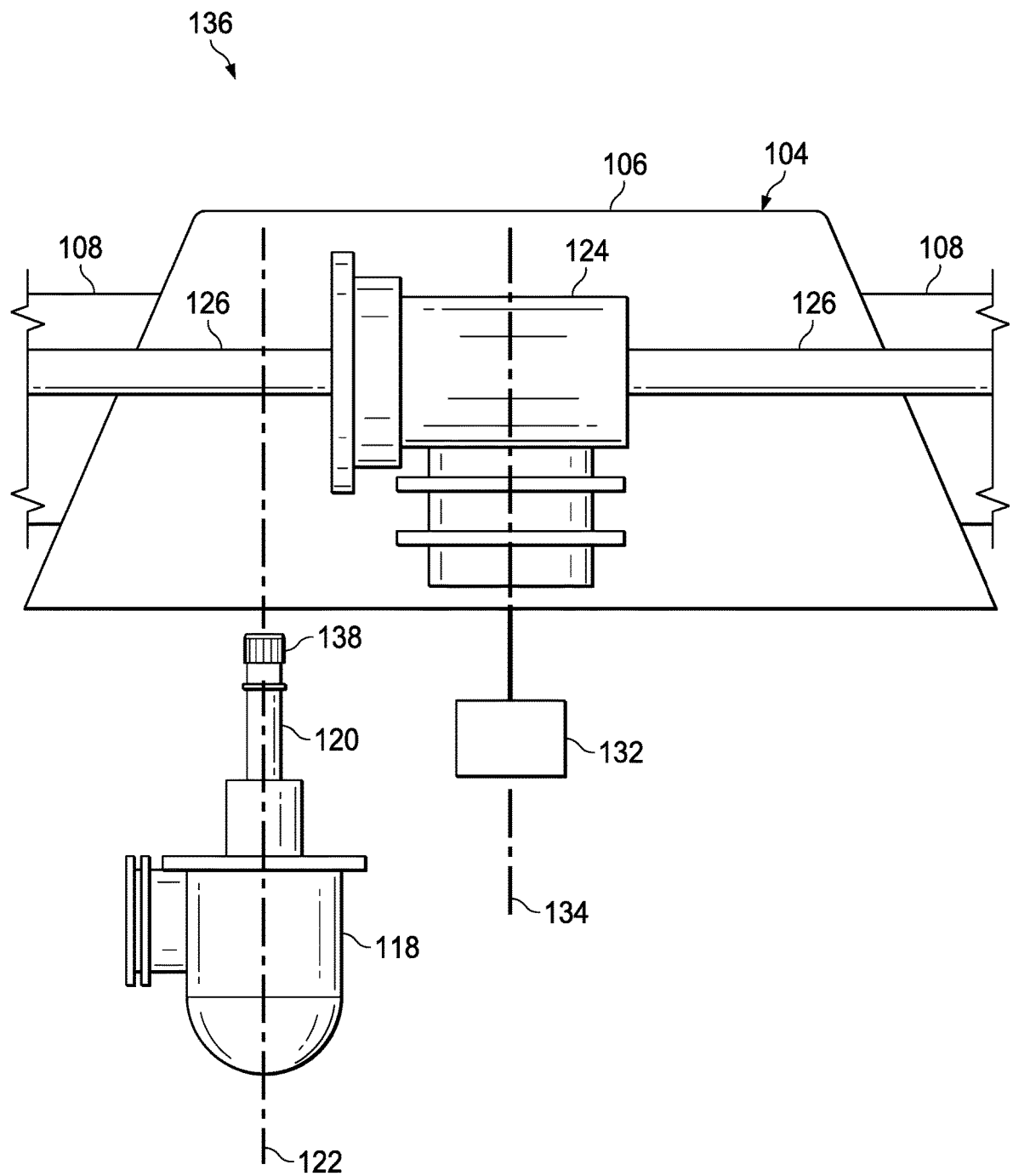
FIG. 4C is a side view of the stow system of the aircraft of FIG. 1 in the disengaged and stowed position.

Referring now to FIGS. 4A-4C, side views of stow system 136 of aircraft 100 of FIGS. 1-3 are shown according to this disclosure. More specifically, FIG. 4A shows retractable driveshaft 120 engaged with mid-wing gearbox 124 and wing assembly 104 in the flight position, FIG. 4B shows retractable driveshaft 120 disengaged from mid-wing gearbox 124 and wing assembly 104 in the flight position, and FIG. 4C shows retractable driveshaft 120 disengaged from mid-wing gearbox 124 and wing assembly 104 rotated about stow axis 134 into the stowed position. Retractable driveshaft 120 and mid-wing gearbox 124 comprise an interface designed to properly align splines 138 of retractable driveshaft 120 and mid-wing gearbox 124 when retractable driveshaft 120 is being extended to engage mid-wing gearbox 124.

In operation, retractable driveshaft 120 is extended and retracted to engage and disengage from, respectively, mid-wing gearbox 124. Retractable driveshaft 120 may be actuated electrically, electro-mechanically, hydraulically, and/or mechanically. For example, in some embodiments, retractable driveshaft 120 may be extended and retracted by a rack and pinion. However, in other embodiments, retractable driveshaft 120 may be extended and retracted by a machine screw type system. When retractable driveshaft 120 is engaged with mid-wing gearbox 124, as shown in FIG. 4A, retractable driveshaft 120 may be withdrawn to a retracted position as shown in FIG. 4B. After retractable driveshaft 120 is retracted, wing assembly 104 may be rotated relative to fuselage 102 about stow axis 134 until wing assembly 104 reaches the stowed position as shown in FIG. 4C. Once stow system 136 of aircraft 100 is configured as shown in FIGS. 3 and 4C, aircraft 100 may be parked, stowed, and/or driven into an entrance of a hangar while reducing the overall footprint of aircraft 100, thereby allowing for more compact storage of aircraft 100 and increased storage capacity of multiple aircrafts 100. Furthermore, from the stowed position shown in FIG. 4C, wing assembly 104 may be rotated relative to fuselage 102 about stow axis 134 until wing assembly 104 reaches the flight position as shown in FIG. 4B. Thereafter, retractable driveshaft 120 may be extended to engage mid-wing gearbox 124 as shown in FIGS. 2 and 4A, where aircraft 100 is configured for flight.

Because engagement of retractable driveshaft 120 must be maintained with mid-wing gearbox 124 in order to maintain flight of aircraft 100, it is imperative that that engagement is failsafe. As discussed above, an actuator is utilized to extend and retract retractable driveshaft 120 in and out of engagement with mid-wing gearbox 124. However, the actuator should not be relied upon to maintain that engagement. Accordingly, there should be a locking mechanism responsible for maintaining the engagement, preferably one that is automatically engaged and disengaged by the actuator, without requiring additional input.

Figure 5:
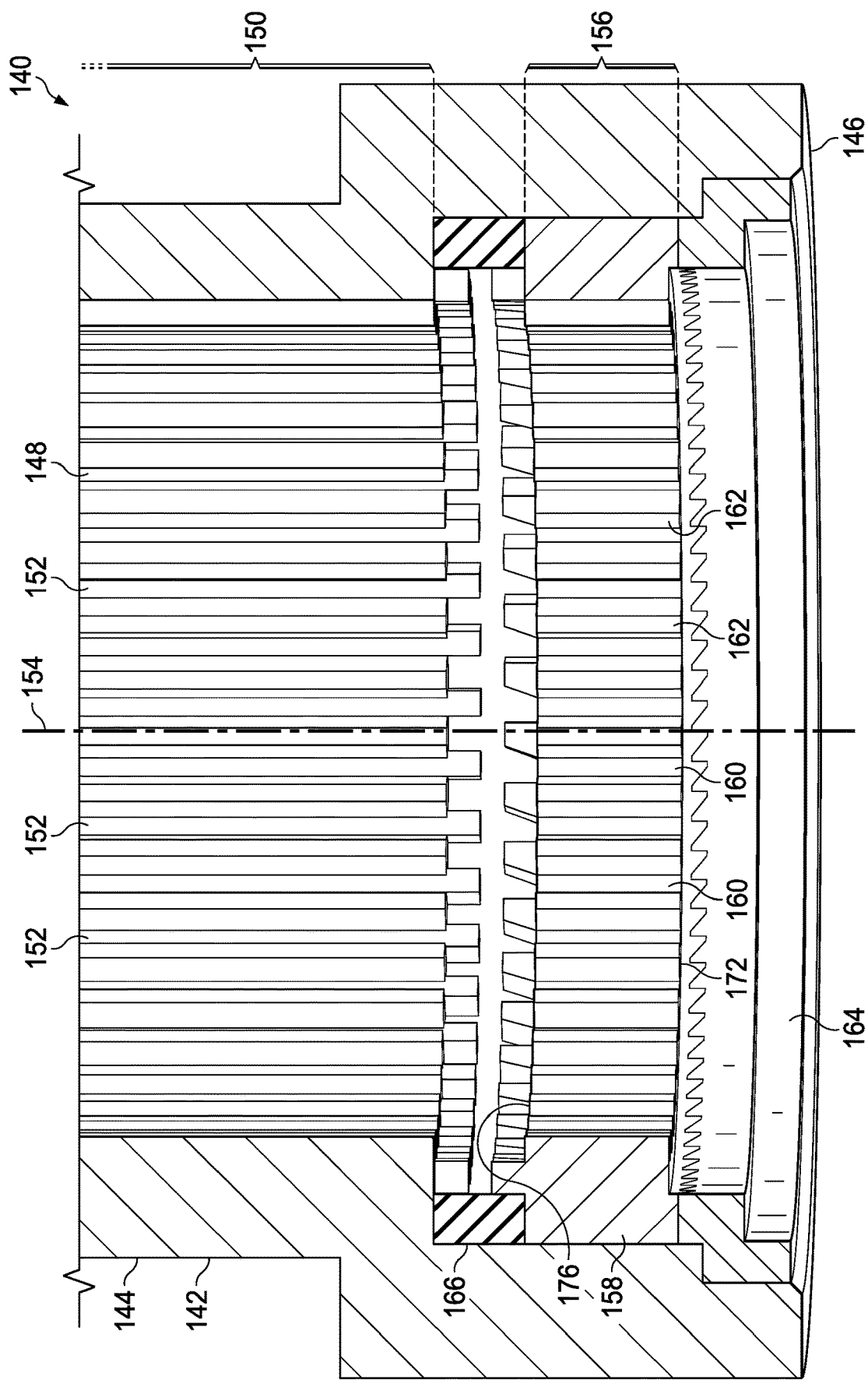
FIG. 5 is a cross-sectional side view of an axially actuated locking system for use with the stow system of FIG. 4A, shown in an unlocked position.

Referring now to FIGS. 5-7E, an axially actuated locking system 140 for use with retractable driveshaft 120 is shown. Locking system 140 is located within mid-wing gearbox 124. As best shown in FIG. 5, locking system 140 includes a housing 142 that has a first end 144, an opposite second end 146, and an interior surface 148. Interior surface 148 includes a grooved section 150 adjacent to first end 144. Grooved section 150 includes a plurality of grooves 152 radially spaced around the circumference of interior surface 148. Grooves 152 are oriented parallel to a central axis 154 of housing 142. Housing 142 further includes a locking ring housing section 156 located between grooved section 150 and second end 146. Locking ring housing section 156 is configured to house a rotatable locking ring 158 at least partially therein.

Locking ring 158 includes a plurality of channels 160 radially spaced around the interior thereof. Channels 160 are oriented parallel to central axis 154 and may have the same axial cross-sectional shape as grooves 152. Each channel 160 is separated from adjacent channels 160 by a ridge 162. Locking ring 158 is retained within locking ring housing section 156 by a band 164. Band 164 is coupled to housing 142 proximate second end 146. Band 164 may be coupled to housing 142 via complementary threads on interior surface 148 and an external surface of band 164. Alternatively, band 164 may be coupled to housing 142 by press-fitting, welding, set screws, adhesive, or any other suitable mechanism for coupling. Locking ring 158 is biased towards band 164 by an elastic member 166 located between grooved section 150 and locking ring 158. Elastic member 166 may be elastomeric, a metallic spring, or any other elastically deformable material or device suitable for use. Elastic member 166 may be in the form of a wave spring.

Figure 6:
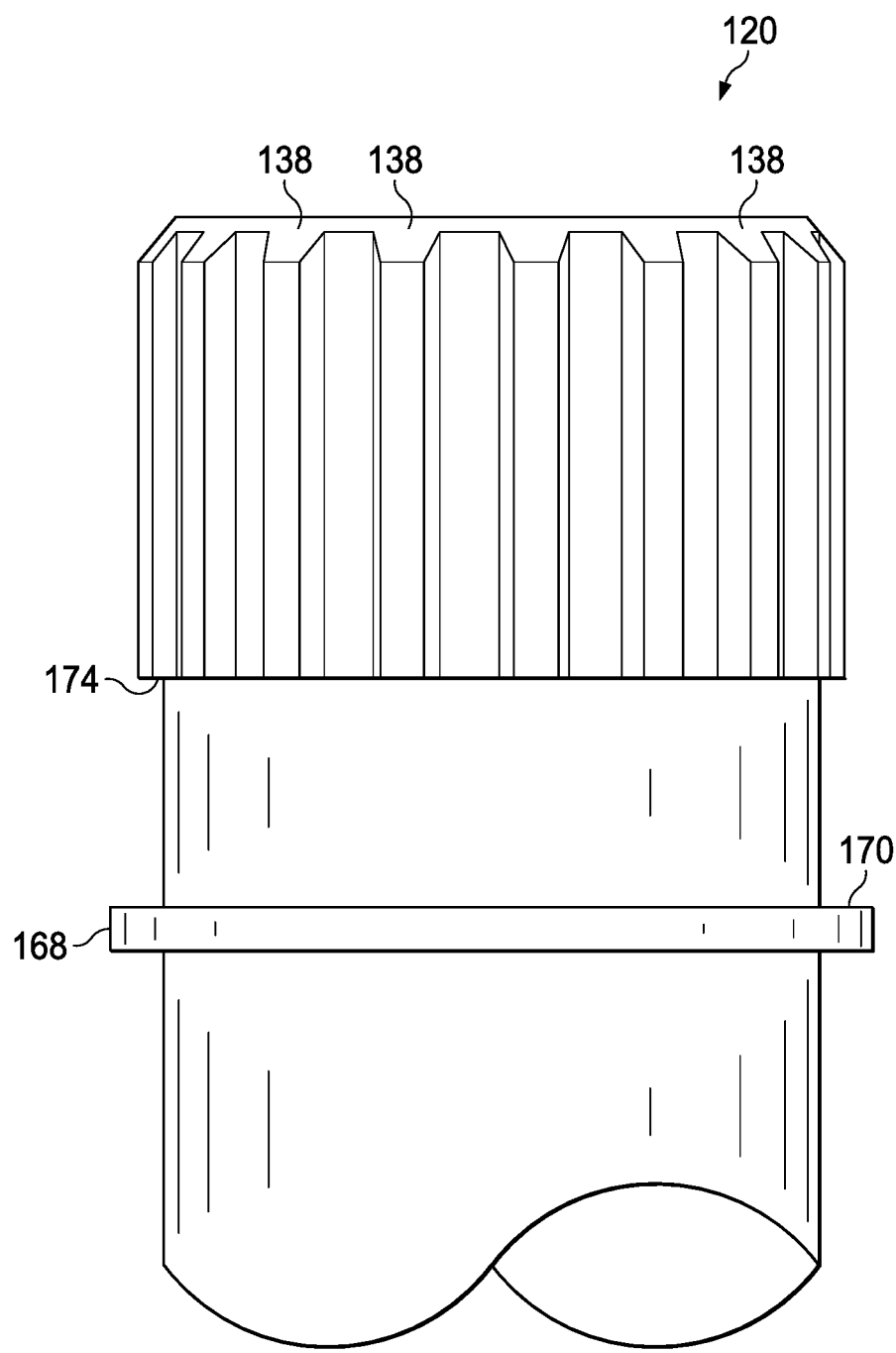
FIG. 6 is a side view of a retractable driveshaft for use with the axially actuated locking system for use with the stow system of FIG. 4A.

Locking system 140 is configured to lock retractable driveshaft 120 therein. As shown in FIG. 6, retractable driveshaft 120 includes an annular flange 168 extending radially therefrom. A top surface 170 of flange 168 is sized and shaped to fit through band 164 and engage bottom surfaces 172 of ridges 162 of locking ring 158. Splines 138 are sized and shaped to slide through channels 160 of locking ring 158 and cooperatively engage grooves 152 of housing 142. In addition, splines 138 include bottom surfaces 174 configured to bear against top surfaces 176 of ridges 162. The distance between bottom surfaces 174 of splines 138 and top surface 170 of flange 168 should be at least as long as ridges 162.

Figure 7E:
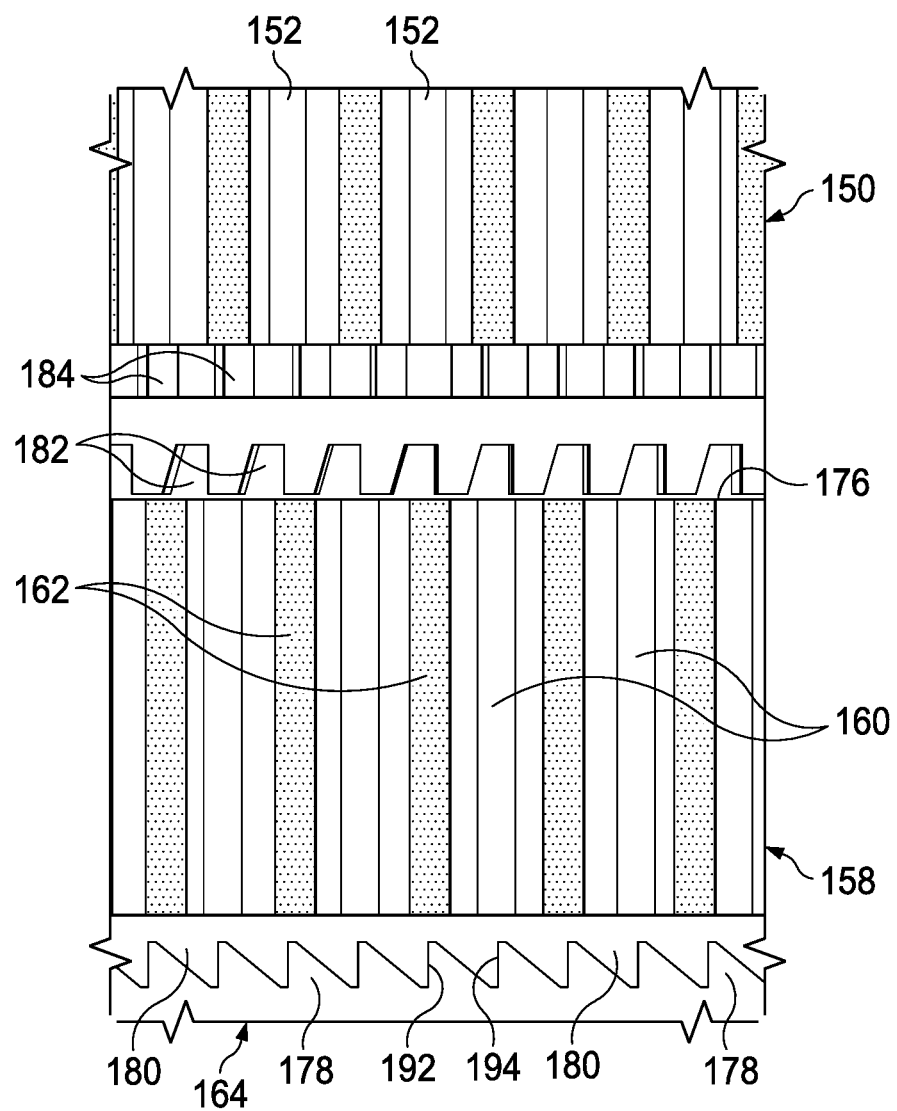
FIG. 7E is a side view of the portion of the axially actuated locking system of FIG. 7A, shown in the locked position.

Operation of locking system 140 is shown in, and discussed in conjunction with, FIGS. 7A-7E. FIG. 7A shows locking system 140 in the unlocked position, ready for insertion of retractable driveshaft 120 therein. Band 164 includes a plurality of first projections 178 extending towards locking ring 158 and locking ring 158 includes a plurality of second projections 180 extending towards band 164. Elastic member 166 pushes locking ring 158 towards band 164 so that first projections 178 cooperatively engage with second projections 180 to prevent relative rotation between locking ring 158 and band 164 in at least one direction.

FIG. 7B shows what happens inside locking system 140 when retractable driveshaft 120 is first inserted therein, with retractable driveshaft 120 not shown so the details of locking system 140 are visible. While retractable driveshaft 120 is inserted along central axis 154, splines 138 pass through channels 160 and into grooves 152. After splines 138 exit channels 160, top surface 170 of flange 168 contacts bottom surfaces 172 of ridges 162. As retractable driveshaft 120 continues advancing along central axis 154, locking ring 158 moves towards grooved section 150 and compresses elastic member 166. As locking ring 158 moves towards grooved section 150, a plurality of first protrusions 182 extending from locking ring 158 towards grooved section 150 contact a plurality of second protrusions 184 extending from housing 142 towards locking ring 158. As plurality of first protrusions 182 are driven into plurality of second protrusions 184, a sloped surface 186 on each first protrusion 182 causes locking ring 158 to rotate about central axis 154 relative to housing 142 and band 164.

FIG. 7C shows the position of locking ring 158 when retractable driveshaft 120 is inserted to maximum depth. In this position, the amount of rotation of locking ring 158 is determined by the total slope of sloped surfaces 186 of first protrusions 182. After full insertion, retractable driveshaft 120 is moved in an opposite direction and backed away from housing 142 along central axis 154.

FIG. 7D shows the position of locking ring 158 as retractable driveshaft 120 is backed away from the full insertion shown in FIG. 7C. As retractable driveshaft 120 backs along central axis 154, elastic member 166 pushes locking ring 158 to follow retractable driveshaft 120 towards band 164. As locking ring 158 moves along central axis 154, sloped surfaces 188 of second projections 180 contact sloped surfaces 190 of first projections 178. Interaction between sloped surfaces 188 and sloped surfaces 190 causes locking ring 158 to rotate further relative to housing 142 and band 164 until vertical surfaces 192 of second projections 180 contact vertical surfaces 194 of first projections 178, thereby preventing further rotation.

FIG. 7E shows the position of locking ring 158 when vertical surfaces 192 of second projections 180 are flush against vertical surfaces 194 of first projections 178, thereby preventing further rotation of locking ring 158 relative to housing 142 and band 164. In this locked position, channels 160 are offset from grooves 152 and ridges 162 are lined up with grooves 152. That is, one axial actuation of locking system 140 causes locking ring 158 to rotate about central axis 154 half the combined width of one channel 160 and one ridge 162. In this locked position, top surfaces 176 of ridges 162 bear against bottom surfaces 174 of splines 138, thereby preventing withdrawal of retractable driveshaft 120 from locking system 140.

In order to withdraw retractable driveshaft 120 from the locked position, the retractable driveshaft 120 is axially advanced along central axis 154 so that top surface 170 of flange 168 pushes first protrusions 182 into contact with second protrusions 184 which starts rotation of locking ring 158 about central axis 154. After retractable driveshaft 120 is fully inserted, it is then backed out along central axis 154. As retractable driveshaft 120 is backed out, elastic member 166 pushes sloped surfaces 188 of second projections 180 into contact with sloped surfaces 190 of first projections 178. Interaction between sloped surfaces 188 and sloped surfaces 190 causes locking ring 158 to rotate until channels 160 line up with grooves 152. When channels 160 line up with grooves 152, splines 138 may slide out of grooves 152 and through channels 160 so that retractable driveshaft 120 may be removed from locking system 140.

It should be understood that first and second projections 178, 180 and first and second protrusions 182, 184 may have shapes different than those shown in FIGS. 5 and 7A-7E while still accomplishing the locking of retractable driveshaft 120 within locking system 140 by affecting rotation of locking ring 158. For example, sloped surfaces 186 of first protrusions 182 may be configured to cause the total rotation of locking ring 158 relative to housing 142 and band 164 while first and second projections 178, 180 are square, rectangular, or trapezoid shaped. Alternatively, second protrusions 184 may have sloped surfaces rather than first protrusions 182.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A locking mechanism, comprising:
   a housing having a first end, an opposite second end, an interior surface, and a central axis, the interior surface including a grooved section having a plurality of grooves generally parallel to the central axis and a locking ring housing section located between the grooved section and the second end;
   a locking ring located at least partially within the locking ring housing section, the locking ring including a plurality of channels generally parallel to the central axis; and
   a band coupled to the housing, the band being configured to cooperatively engage the locking ring;
   wherein the locking ring is configured to move from an unlocked position wherein the plurality of channels of the locking ring are generally aligned with the plurality of grooves of the housing to a locked position wherein the plurality of channels of the locking ring are offset from the plurality of grooves of the housing.

2. The locking mechanism of claim 1, further comprising:
   a shaft having a plurality of splines configured to pass through the plurality of channels of the locking ring and fit within the plurality of grooves of the housing.

3. The locking mechanism of claim 2, wherein the shaft further includes a flange configured to contact a bottom surface of the locking ring and apply an axial force thereto.

4. The locking mechanism of claim 3, further comprising:
   an elastic member located between the locking ring and the housing, the elastic member being configured to bias the locking ring towards the band.

5. The locking mechanism of claim 4, wherein the band includes a plurality of first projections extending towards the locking ring and the locking ring includes a plurality of second projections extending toward the band, and the plurality of second projections being configured to prevent relative rotation about the central axis between the locking ring and the band in at least a first direction.

6. The locking mechanism of claim 5, wherein the locking ring includes a plurality of first protrusions extending towards the grooved section of the housing and the housing includes a plurality of second protrusions extending towards the locking ring, wherein the plurality of first protrusions and the plurality of second protrusions are configured to cause relative rotation about the central axis between the locking ring and the housing when the plurality of first protrusions are axially advanced into contact with the plurality of second protrusions.

7. The locking mechanism of claim 6, wherein the plurality of first projections and the plurality of second projections have complementary sloped surfaces that cause the locking ring to rotate about the central axis relative to the housing when the plurality of first projections are axially advanced into contact with the plurality of second projections.

8. The locking mechanism of claim 7, wherein the locking mechanism is configured so that a total rotation of the locking ring relative to the housing caused by axial advancement of the plurality of first protrusions against the plurality of second protrusions and axial advancement of the plurality of first projections against the plurality of second projections is equal to a width of one of the plurality of grooves.

9. A method of locking and disengaging a driveshaft, comprising:
   providing a locking mechanism, comprising:
      a housing having a first end, an opposite second end, an interior surface, and a central axis, the interior surface including a grooved section having a plurality of grooves generally parallel to the central axis;
      a locking ring including a plurality of channels generally parallel to the central axis; and
      a band coupled to the housing, the band being configured to cooperatively engage the locking ring;
   inserting the driveshaft into the locking mechanism along the central axis so that splines of the driveshaft pass through the plurality of channels of the locking ring;
   advancing the locking ring toward the first end of the housing by applying an axial force thereto with a flange of the driveshaft;
   backing the driveshaft until contact between the splines of the driveshaft and the locking ring prevents further backing of the driveshaft;
   advancing the locking ring toward the first end of the housing by applying an axial force thereto with the flange of the driveshaft; and
   withdrawing the driveshaft from the locking mechanism along the central axis so that the splines of the driveshaft pass through the plurality of channels of the locking ring.

10. The method of claim 9, wherein the advancing of the locking ring causes a plurality of first protrusions extending from the locking ring to interact with a plurality of second protrusions extending from the housing, the interaction between the plurality of first protrusions and the plurality of second protrusions causing the locking ring to rotate relative to the housing.

11. The method of claim 10, wherein the backing of the driveshaft allows a plurality of first projections extending from the band to interact with a plurality of second projections extending from the locking ring, the interaction between the plurality of first projections and the plurality of second projections causing the locking ring to rotate relative to the housing.

12. The method of claim 11, wherein a total rotation of the locking ring caused by the interaction between the plurality of first protrusions and the plurality of second protrusions and the interaction between the plurality of first projections and the plurality of second projections is equal to half of a combined width of one of the plurality of channels and one of a plurality of ridges between the plurality of channels.

13. An aircraft, comprising:
   a fuselage;
   a driveshaft including a plurality of splines and a flange;
   a gearbox; and
   a locking system, comprising:
      a housing having a first end, an opposite second end, an interior surface, and a central axis, the interior surface including a grooved section having a plurality of grooves generally parallel to the central axis, the plurality of grooves being configured to receive the plurality of splines therein;
      a locking ring including a plurality of channels generally parallel to the central axis, the plurality of channels being configured to allow the plurality of splines to pass therethrough when the locking ring is in an unlocked position; and
      a band coupled to the housing, the band being configured to cooperatively engage the locking ring.

14. The aircraft of claim 13, wherein the locking system further includes an elastic member located between the locking ring and the band, the elastic member being configured to bias the locking ring towards the band.

15. The aircraft of claim 14, wherein the elastic member is a wave spring.

16. The aircraft of claim 14, wherein the locking ring includes a plurality of ridges separating the plurality of channels, each of the plurality of ridges having a top surface configured to bear against a bottom surface of one of the plurality of splines when the locking ring is in a locked position.

17. The aircraft of claim 16, wherein the band includes a plurality of first projections extending towards the locking ring and the locking ring includes a plurality of second projections extending toward the band, the plurality of first projections and the plurality of second projections being configured to prevent relative rotation about the central axis between the locking ring and the band in at least a first direction when the locking ring is in the unlocked position or in the locked position.

18. The aircraft of claim 17, wherein the locking ring includes a plurality of first protrusions extending towards the grooved section of the housing and the housing includes a plurality of second protrusions extending towards the locking ring, wherein the plurality of first protrusions and the plurality of second protrusions are configured to cause relative rotation about the central axis between the locking ring and the housing when the plurality of first protrusions are axially advanced into contact with the plurality of second protrusions.

19. The aircraft of claim 18, wherein the plurality of first projections and the plurality of second projections have complementary sloped surfaces that cause the locking ring to rotate about the central axis relative to the housing when the plurality of first projections are axially advanced into contact with the plurality of second projections.

20. The aircraft of claim 19, wherein the locking system is configured so that a total rotation of the locking ring relative to the housing caused by axial advancement of the plurality of first protrusions against the plurality of second protrusions and axial advancement of the plurality of first projections against the plurality of second projections is equal to half of a combined width of one of the plurality of channels and one of the plurality of ridges.

* * * * *